United States Patent [19]

Franke

[11] Patent Number: 5,268,629
[45] Date of Patent: Dec. 7, 1993

[54] ELECTRICAL APPLIANCE WITH BATTERY CHARGING CAPABILITY AND CONNECTION MEANS

[75] Inventor: Wolfgang Franke, Langen, Fed. Rep. of Germany

[73] Assignee: Braun Aktiengesellschaft, Frankfurt, Fed. Rep. of Germany

[21] Appl. No.: 835,706

[22] Filed: Feb. 12, 1992

[30] Foreign Application Priority Data

Feb. 18, 1991 [DE] Fed. Rep. of Germany ....... 4104885

[51] Int. Cl.$^5$ ...................... B26B 19/00; H01M 10/46
[52] U.S. Cl. ......................................... 320/2
[58] Field of Search ...................... 320/2; 30/DIG. 1; 15/DIG. 1; 439/507-514

[56] References Cited

U.S. PATENT DOCUMENTS

| | | | |
|---|---|---|---|
| 3,145,404 | 8/1964 | Fiedler | 320/2 |
| 3,268,786 | 8/1966 | Reich | 15/DIG. 1 |
| 3,369,294 | 2/1968 | Shaw et al. | 320/2 |
| 4,104,795 | 8/1978 | Lopic | 30/DIG. 1 |
| 4,225,814 | 9/1980 | Gantz et al. | 320/2 |
| 4,451,693 | 5/1984 | Vest | 174/52 R |
| 5,138,245 | 8/1992 | Mattinger | 320/2 |

FOREIGN PATENT DOCUMENTS 0344988 12/1989 European Pat. Off. .
3304096 2/1983 Fed. Rep. of Germany .
0344640 3/1960 Switzerland .

*Primary Examiner*—Steven L. Stephan
*Assistant Examiner*—Thomas M. Dougherty
*Attorney, Agent, or Firm*—Fish & Richardson

[57] ABSTRACT

The invention is directed to an electrical appliance comprising a housing structure for accommodating at least one functional component and at least one rechargeable storage cell cooperating with the functional component, a storage cell charging circuitry, as well as an appliance plug provided on the appliance and comprising a connector base having a receiving aperture in which contact pins are provided for engagement with a connector of a power cord supplying electrical power to the storage cell. Adapted to be mounted on the connector base is a supporting structure including two contact elements, the supporting structure establishing electrical continuity between the storage cell and the contact pins when mounted on the appliance, and breaking it when detached from the appliance.

11 Claims, 3 Drawing Sheets

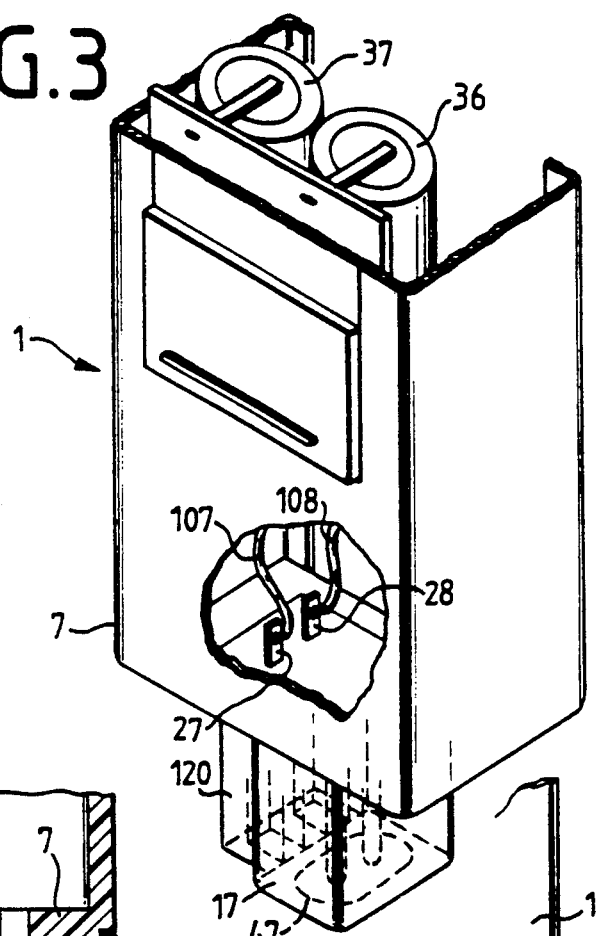
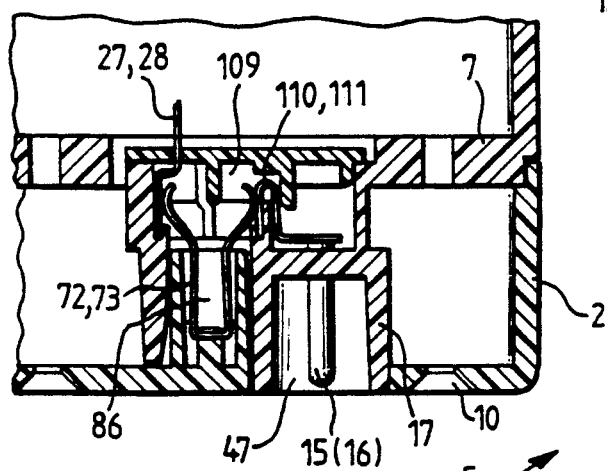
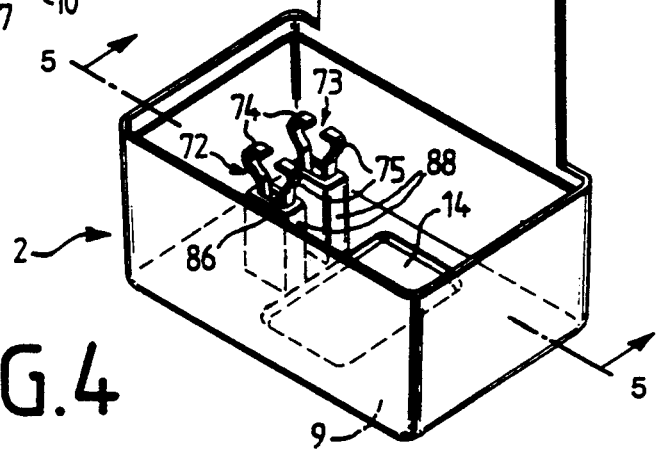

ELECTRICAL APPLIANCE WITH BATTERY CHARGING CAPABILITY AND CONNECTION MEANS

This invention relates to an electrical appliance comprising a housing for accommodating at least one functional component and at least one rechargeable storage cell cooperating with the functional component, a storage cell charging circuitry, as well as an appliance plug provided on the appliance and comprising a connector base having a receiving aperture in which contact pins are provided for engagement with a mating connector of a power cord supplying electrical power to the storage cell.

Electrical appliances of this type operated by means of rechargeable storage cells including, for example, electric shavers, toothbrushes, screwdrivers, drills, flashlights, etc., are widely used in practice. For recharging the storage cells, these electrical appliances are equipped with an appliance plug standardized for safety reasons, its receiving aperture being adapted to receive in positive engagement therewith an equally standardized connector of a power cord for supplying a line voltage. The utility of such electrical appliances is very high, because the storage cells can be recharged very frequently. After each charging operation, a fully functional electrical appliance is available which can then be used without being connected to a power cord. The storage cell charging circuitry of such electrical appliances frequently includes further electric components ensuring operation of the electrical appliance directly on the supply line, irrespective of the charging condition of the storage cells.

As is known, the useful life of rechargeable storage cells is limited. Therefore, electrical appliances equipped with rechargeable storage cells should be constructed with a view to allowing safe removal of spent storage cells.

It is an object of the present invention to configure an electrical appliance of the type initially referred to in such a manner that the rechargeable storage cells can be readily removed from the electrical appliance, without involving the risk for the operator to come in contact with the dangerous line voltage.

According to the present invention, this object is accomplished in that a supporting structure including at least one contact element is adapted to be mounted on the housing or the connector base, the supporting structure establishing electrical continuity between the storage cell and the contact pins when mounted on the appliance, and breaking it when detached from the appliance. This affords an easy way of removing the storage cells from the appliance, involving only the step of detaching the supporting structure from the housing to be able to reach into the interior where the storage cells are accommodated. The storage cells can then be removed without much manipulation. Operation of the appliance can be resumed only after new storage cells are inserted and the supporting structure carrying the contact elements is reinstalled on the appliance. Removal of the supporting structure carrying the contact elements precludes unauthorized operation also in cases where the connector is coupled to the appliance plug.

Further it is an advantage that the supporting structure is configured as a housing portion completing the housing and carrying two contact elements. In an embodiment of the invention, the contact element is comprised of an approximately U-shaped resilient member having two opposite arms, wherein, with the housing portion mounted on the housing, the one arm is adapted to abut against a terminal lug and the other arm is adapted to abut against a contact pin by either direct or indirect means. This makes it possible to establish electrical continuity between the storage cells connected to the terminal lugs and the contact pins.

According to another possibility disclosed in a further development of the device of the invention, each contact element is received in an opening provided in the housing portion, the opening having opposite side walls against which the arms of the contact element abut. Because the contact elements are advantageously provided in the detachable housing portion covering also the interior space in which the storage cells are received, this part fulfils a dual function in a simple and economical manner. In the first place, it prevents the appliance from becoming live on removal of the storage cells, and in the second place the housing portion ensures that the housing or its interior are closed completely when it is reinstalled after removal of the storage cells.

In a further embodiment of the present invention, the contact pins are advantageously fixedly disposed in a connector base surrounding the contact pins and are connected to the storage cell or cells by means of a respective one of the terminal lugs adapted to be brought into contact with the contact elements.

In a preferred embodiment of the invention, the appliance is formed of a housing frame, at least one housing structure adapted to be mounted on the housing frame, and a housing portion completing the housing structure, wherein the housing structure and/or the housing frame serve the function of receiving the connector base.

It is of particular relevance to the present invention that the bottom wall of the detachable housing portion is provided with mounting structures having blind-end bores therein for receiving the contact elements, wherein, spaced from the contact elements, an opening is provided in the bottom wall which is slipped over the connector base as the housing portion is seated on the housing structure.

Another advantage is that the connector base is disposed on the bottom wall of the housing frame, with a receptacle for receiving the contact elements being provided adjacent to the connector base, the contact elements being inserted in the receptacle when the housing portion is mounted on the housing. This results in a highly compact construction in which all essential parts are accommodated in a minimum of space.

Further features of the present invention will be set out and illustrated in the subclaims, the description and, respectively, the Figures, it being understood that all single features and all combinations of single features are essential to the invention.

The solution of the invention is suitable for use with any type of electrical appliance operated with rechargeable storage cells, in which charging and operation can be performed by means of a connector attached to a plug-in power cord, such appliances including, for example, electric shavers, toothbrushes, screwdrivers, drills, flashlights, and the like. A preferred application is a shaving apparatus equipped with rechargeable storage cells.

While an embodiment of the present invention is illustrated by way of example in the accompanying drawings, the invention is not intended to be limited to this specific embodiment. In the drawings, FIG. 1 is a perspective view of a shaving apparatus with a shell-type housing portion;

FIG. 3 is a view of a housing frame of the electrical appliance;

FIG. 4 is a view of a detachable housing portion incorporating the contact elements of the invention, the housing portion being adapted to be slipped onto the housing frame; and FIG. 5 is a longitudinal sectional view taken along the line A—A of FIG. 4.

Figure 1:
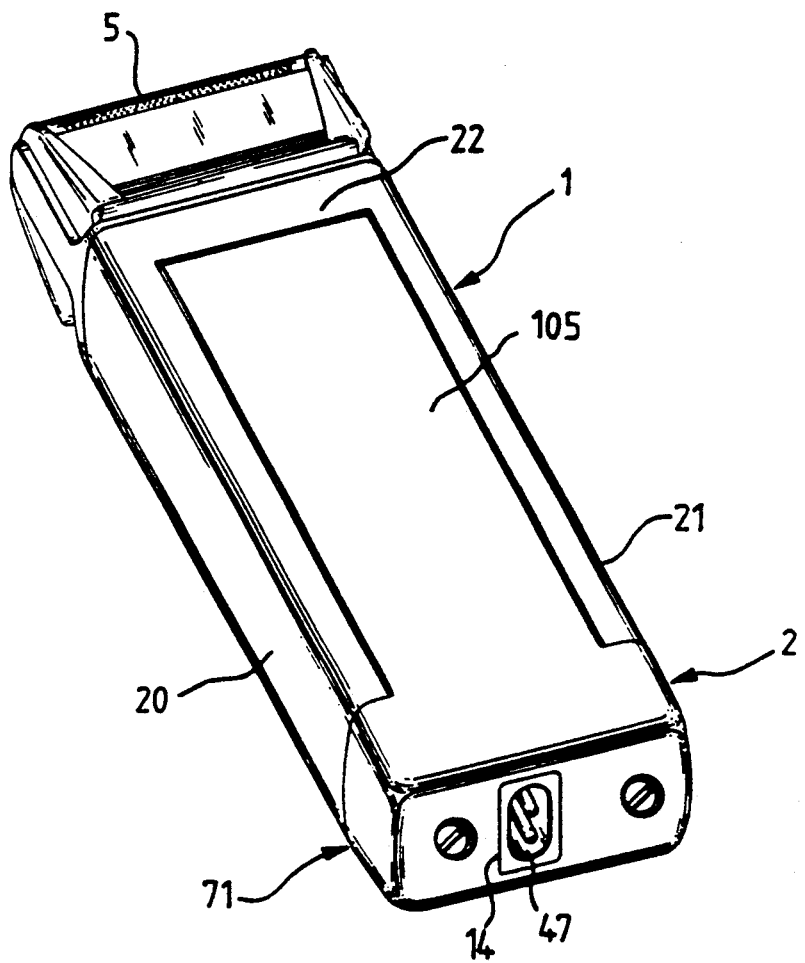

Referring now to the drawings, FIG. 1 shows an electrical appliance, in particular a dry shaving apparatus, comprising a housing structure 1 and a detachable supporting structure 71 in the form of a cup-shaped housing portion 2, an ON/OFF switch slidably arranged on the front panel of the housing 1 for energization of the electric drive received in the housing structure 1, and a shaving head 5 provided at the upper end of the housing structure 1.

The housing structure 1 (FIG. 2) is comprised of a housing frame 7 and a detachable housing portion 2 surrounding the housing structure and conformed to the outer contour of the housing structure 1. The housing portion 2 has a bottom wall 9 in which two round cut-outs 10, 11 receiving screws 12, 13 therein as well as a rectangular opening 14 are provided. Arranged in the opening 14 are two contact pins 15, 16 which are surrounded by a connector base 17 and protrude from the opening 14.

A power cord necessary for charging the storage cells 36, 37 disposed on the housing frame 7 or, alternatively, for operating the electrical appliance or the shaving apparatus directly on the line is assigned reference numeral 100. The power cord 100 has at its one end a conventional attachment plug 102 and at its other end a connector 103 intended to be coupled to the electrical appliance. The connector 103 has its outer shape conformed to the contour of a receiving aperture 47 of the connector base 17, which aperture is determined by two planar narrow end walls 94, 95 (FIGS. 1, 2) extending in the horizontal direction and two longitudinal side walls 97 interconnecting the end walls in vertical direction.

The housing 1 (FIGS. 1, 2) is essentially comprised of two longitudinal end walls 20, 21 and a wall 22 interconnecting the opposite ends, as well as a front panel not shown in the drawings.

The end walls 20, 21 and the wall 22 form a cutout which is adapted to be closed by insertion of a T-shaped wall portion 105, which is accomplished by mounting the housing portion 2 incorporating the freely extending upper wall portion 105 on the housing structure 1 to form a complete assembly. The housing portion 2 is fastened to the housing frame 7 by means of screws 12, 13 insertable into the respective cutouts 10, 11.

Figure 2:
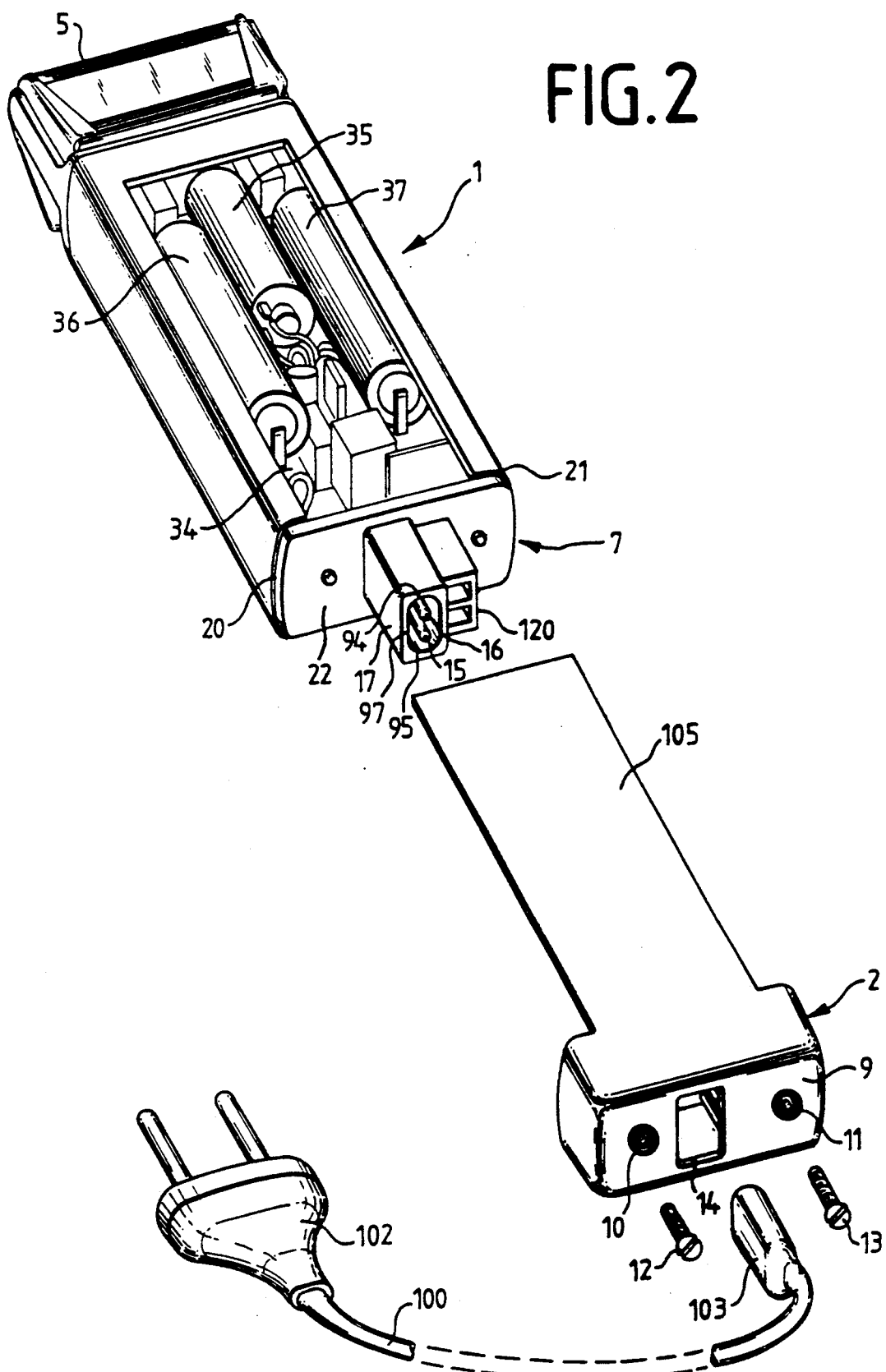
FIG. 2 is an exploded view of an opened shaving apparatus in which the housing portion is removed, showing also a connector base which is part of an appliance plug.

As becomes apparent from FIGS. 2 and 3, an electric drive motor 35, rechargeable storage cells 36, 37 as well as further electric components of an electric circuitry, in particular a storage cell charging circuitry, are mounted on a printed circuit board 34 provided in the housing structure 1.

As becomes apparent from FIGS. 3 and 5, the electric circuitry of the two storage cells 36, 37 is connected to terminal lugs 27, 28 arranged in the housing frame 7 by means of respective electric leads 107, 108, the lugs extending each into a respective blind-end bore 109 (FIG. 5) provided in a receptacle 120 on the housing frame 7.

As becomes apparent from FIGS. 4 and 5, in assembled condition of the housing portion 2, the two mounting structures 88 have their respective blind-end bores 86 in opposed arrangement relative to the two blind-end bores 109 which are provided in the housing frame 7 and serve to receive the terminal lugs 27, 28.

The connector base 17 is provided on the bottom wall 22 of the housing frame 7, the receiving aperture 47 thereof accommodating two contact pins 15, 16 having their inwardly extending ends connected to respective terminal lugs 110 and 111.

The two pairs of terminal lugs 27, 28 and 110, 111 lie on the same horizontal plane when viewing the drawing so that in the assembly of the housing portion 2 with the housing 1 or the housing frame 7, the contact elements 72, 73 are introduced into the corresponding blind-end bores 109 of the housing frame to an extent sufficient to establish contact between the two opposite pairs of terminal lugs 110, 111 and 27, 28.

To be able to establish electrical contact between the opposite pairs of terminal lugs 27, 28 and 110, 111, the contact elements 72, 73 are comprised of an approximately U-shaped resilient member having two opposite arms 74, 75 extending approximately parallel to each other. Each of the arms 74, 75 has its upper end angled or rounded, abutting in the mounted condition of the housing portion 2 against the opposite terminal lugs 27, 28, 110, 111. Owing to the resilient configuration of the contact elements 72, 73, perfect electrical contact is made between the terminal lugs.

To avoid accidental detachment of the housing portion 2 from the housing structure 1, the housing portion 2 is secured to the housing frame 7 by means of screws 12, 13, for example.

If it is desired to remove the storage cells from the electrical appliance, this merely involves the steps of removing the two screws 12, 13 and subsequently withdrawing the housing portion 2 from the fixed housing structure 1 or the housing frame 7. Access to the interior of the housing structure 1 is then possible to an extent sufficient to allow ready removal of the storage cells 36, 37 and/or the printed circuit board from the housing structure (FIG. 2). Although the connector base 17 with the two contact pins 15, 16 continues to be secured to the housing 1, electrical contact between the storage cells 36, 37 and a source of power cannot be established after insertion of the connector 103.

I claim:

1. An electrical appliance comprising housing structure for accommodating at least one functional component and at least one rechargeable storage cell cooperating with said functional component, said housing structure including a housing frame and a detachable housing portion for mounting on said housing frame to complete said housing structure, storage cell charging circuitry, appliance plug structure on said housing frame, said appliance plug structure including a connector base having a receiving aperture, contact pin structure in said receiving aperture for engagement with a connector of a power cord for supplying electrical power to said storage cell, said detachable housing portion including contact element structure for establishing electrical continuity between said storage cell and said contact pin structure when said detachable housing portion is mounted on said housing frame, and breaking said electrical continuity when said detachable housing portion is detached from said housing frame.

2. The electrical appliance of claim 1 wherein said contact element structure on said detachable housing portion includes two contract elements.

3. The electrical appliance of claim 2 further including terminal lug structure connected to said storage cell charging circuitry, and wherein each said contact element structure includes an approximately U-shaped resilient member with two opposed arms, wherein, with said detachable housing portion mounted on said housing frame, one said arm is adapted to abut against said terminal lug structure and the other said arm is adapted to abut against said contact pin structure by either direct or indirect means.

4. The electrical appliance of claim 1 wherein said contact element structure includes a contact element received in an opening in said detachable housing portion.

5. The electrical appliance of claim 4 wherein said contact element is an approximately U-shaped resilient member with two opposed arms and said opening has opposite side walls against which said arms of said contact element abut.

6. The electrical appliance of claim 1 wherein said housing frame includes terminal lug structure, and said contact pin structure is fixedly disposed in said connector base and is connected to said storage cell when said terminal lug structure is in contact with said contact element structure.

7. The electrical appliance of claim 2 wherein said detachable housing portion includes a bottom wall with mounting structure having blind-end bore structure for receiving said contact element structure, and an opening is provided in said bottom wall which is disposed over said connector base when said detachable housing portion is seated on said housing frame.

8. The electrical appliance of claim 2 wherein said housing frame has a bottom wall and said connector base is disposed on said bottom wall of said housing frame, and receptacle structure for receiving said contact element structure on said housing frame adjacent said connector base, said contact element structure being inserted in said receptacle structure when said detachable housing portion is mounted on said housing frame.

9. An electrical appliance comprising housing structure for accommodating at least one functional component and at least one rechargeable storage cell cooperating with said functional component, said housing structure including a housing frame and a detachable housing portion for mounting on said housing frame to complete said housing structure, storage cell charging circuitry, terminal lug structure connected to said storage cell charging circuitry, appliance plug structure on said housing frame, said appliance plug structure including a connector base having a receiving aperture, contact pin structure provided in said receiving aperture for engagement with a connector of a power cord for supplying electrical power to said storage cell, said detachable housing portion including an approximately U-shaped resilient contact member with two opposed arms for establishing electrical continuity between said storage cell and said contact pin structure when said detachable housing portion is mounted on said housing frame, and breaking said electrical continuity when said detachable housing portion is detached from said housing frame, one said arm being adapted to abut against said terminal lug structure and the other said arm is adapted to abut against said contact pin structure by either direct or indirect means.

10. An electrical appliance comprising housing structure for accommodating at least one functional component and at least one rechargeable storage cell cooperating with said functional component, said housing structure including a housing frame and a detachable housing portion for mounting on said housing frame to complete said housing structure, storage cell charging circuitry, appliance plug structure on said housing frame, said appliance plug structure including a connector base having a receiving aperture, contact pin structure provided in said receiving aperture for engagement with a connector of a power cord for supplying electrical power to said storage cell, said detachable housing portion including a bottom wall with mounting structure having blind-end bore structure and an opening in said bottom wall which is disposed over said connector base when said detachable housing portion is seated on said housing frame, contact element structure in said blind-end bore structure for establishing electrical continuity between said storage cell and said contact pin structure when said detachable housing portion is mounted on said housing frame, and breaking said electrical continuity when said detachable housing portion is detached from said housing frame.

11. An electrical appliance comprising housing structure for accommodating at least one functional component and at least one rechargeable storage cell cooperating with said functional component, said housing structure including a housing frame with a bottom wall and a detachable housing portion for mounting on said housing frame to complete said housing structure, storage cell charging circuitry, appliance plug structure on said housing frame, said appliance plug structure including a connector base disposed on said bottom wall of said housing frame and having a receiving aperture, contact pin structure provided in said receiving aperture for engagement with a connector of a power cord for supplying electrical power to said storage cell, said detachable housing portion including contact element structure for establishing electrical continuity between said storage cell and said contact pin structure when said detachable housing portion is mounted on said housing frame, and breaking said electrical continuity when said detachable housing portion is detached from said housing frame, and receptacle structure for receiving said contact element structure on said housing frame adjacent said connector base, said contact element structure being inserted in said receptacle structure when said detachable housing portion is mounted on said housing frame.

* * * * *